US012718616B2

(12) United States Patent
Erro et al.

(10) Patent No.: US 12,718,616 B2
(45) Date of Patent: Aug. 25, 2026

(54) COMPUTER-IMPLEMENTED METHOD FOR OBTAINING INFORMATION ON BIOMETRIC FEATURES OF A USER

(71) Applicant: IDENTY INC., Dover, DE (US)

(72) Inventors: Daniel Erro, Madrid (ES); Hardik Gupta, Jabalpur (IN)

(73) Assignee: Identy, Inc., Dover, DE (US)

( * ) Notice: Subject to any disclaimer, the term of this patent is extended or adjusted under 35 U.S.C. 154(b) by 0 days.

(21) Appl. No.: 18/761,843

(22) Filed: Jul. 2, 2024

(65) Prior Publication Data

US 2025/0384711 A1 Dec. 18, 2025

(30) Foreign Application Priority Data

Jun. 17, 2024 (EP) .................................... 24382652

(51) Int. Cl.
*G06V 40/12* (2022.01)
*G06T 7/70* (2017.01)

(52) U.S. Cl.
CPC ............ *G06V 40/1347* (2022.01); *G06T 7/70* (2017.01); *G06T 2207/20084* (2013.01)

(58) Field of Classification Search
CPC ............................................ G06V 40/12–1394
See application file for complete search history.

(56) References Cited

U.S. PATENT DOCUMENTS 11,527,092 B1 * 12/2022 Farber .................... G06N 3/088
2018/0218196 A1 * 8/2018 Chhabra ................ G06V 40/50
2020/0082147 A1 3/2020 Thuillier
2021/0158014 A1 * 5/2021 Iatsun ................ G06V 40/1371
2021/0326571 A1 * 10/2021 Nakvosas ............. G06V 10/82
2021/0365532 A1 11/2021 Engelsma

OTHER PUBLICATIONS

The extended European search report for EP Application No. 24382652.6, dated Dec. 5, 2024, 11 pages.

* cited by examiner

*Primary Examiner* — Roberto W Flores
(74) *Attorney, Agent, or Firm* — Lowenstein Sandler LLP

(57) ABSTRACT

A computer-implemented method for obtaining information on biometric features of a fingerprint of a user, the method comprising obtaining an image comprising an object carrying one or more biometric features of a user, the image having a size of N×M pixels, processing the image and determining information indicative at least of a presence of a biometric feature in the block and a kind of the biometric feature to obtain a result, and outputting the result identifying the information wherein the result has a form of n×m blocks of identical size and the result associates information indicative at least of a presence of a biometric feature and a kind of the biometric feature with each block, wherein N is an integer multiple of n and M is an integer multiple of m.

17 Claims, 4 Drawing Sheets

COMPUTER-IMPLEMENTED METHOD FOR OBTAINING INFORMATION ON BIOMETRIC FEATURES OF A USER

RELATED APPLICATIONS

This Application claims the benefit under 35 U.S.C. § 119(a) of EP patent application Ser. No. 24/382,652.6, filed Jun. 17, 2024, which is incorporated by reference herein.

TECHNICAL FIELD

The present disclosure relates to a computer-implemented method for obtaining information on biometric features of a user and a computing system on which to implement the method.

BACKGROUND

Systems and methods for obtaining information on biometric features of a user are known. For example, from "Robust minutiae extractor: integrating deep networks and fingerprint domain knowledge" by Nguyen et al, methods employing neural networks for identifying the location of minutiae in a fingerprint image of a user are known.

However, the known technologies require sophisticated neural networks to identify the relevant information on the biometric features or require additional filtering steps like Gabor filtering for pre-processing the image, which is expensive in terms of computational resources required. Furthermore, several of the known approaches usually require orientation maps or segmentation masks that have to be trained, which likewise is computationally expensive.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
FIG. 1 shows a flowchart of a computer implemented method according to at least one embodiment of the present disclosure.
Figure 1:
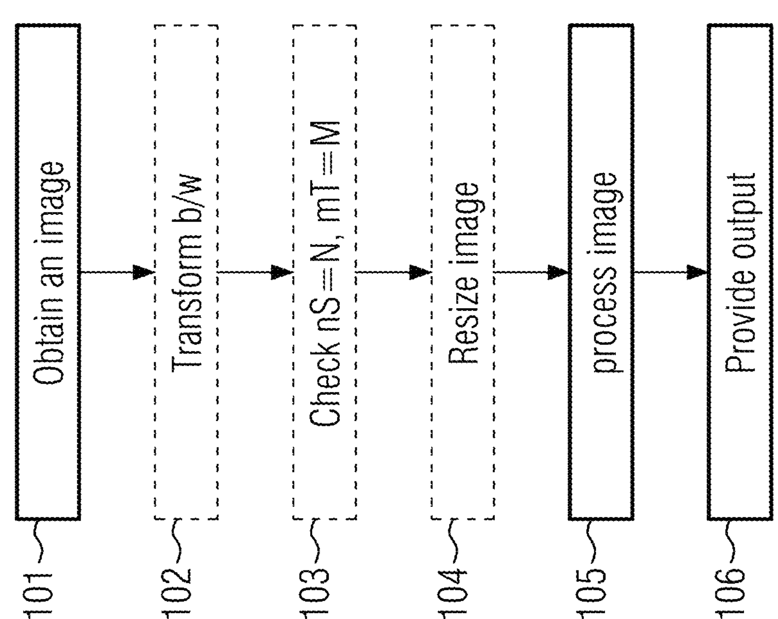

Aspects of the present disclosure provide a computer-implemented method for obtaining information on biometric features of a user, like minutiae of a fingerprint, in a less resource-expensive manner while at the same time obtaining reliable information.

Aspects of the present disclosure describe a computer-implemented method for obtaining information on biometric features of a user and a computing system comprising a processor and memory on which to implement the computer-implemented method.

The computer-implemented method for obtaining information on biometric features of a fingerprint of a user according to the invention comprises: obtaining an image comprising an object carrying one or more biometric features of a user, the image having a size of N×M pixels; processing the image and determining information indicative at least of a presence of a biometric feature in the block and a kind of the biometric feature to obtain a result; and outputting the result identifying the information associated, wherein the result has a form of n×m blocks of identical size and the result associates information indicative at least of a presence of a biometric feature and a kind of the biometric feature with each block, wherein N is an integer multiple of n and M is an integer multiple of m.

According to some embodiments of the present disclosure, the processing of the image produces an output that has a shape of, or can at least be represented in the form of, n×m blocks. This means that according to some embodiments of the present disclosure, the obtained and output result can also be in a shape different from that of n×m blocks but the result must be such that, for example by applying mathematical transformations, it can be represented in the form of n×m blocks.

For example, in case the processing is executed using a neural network, it can be provided that the processing of the image by the neural network results in a result being output by the last layer of the neural network that has the shape of or can be represented as, a tensor where two indices denote, for example, the position of a block in the horizontal and vertical direction and the third index of the tensor or any other indices of the tensor identify the information associated with the respective block. Insofar, the above separation of the separating step and the processing step is not intended to construe a timely order.

The blocks are not particularly restricted to square shape but can also be of rectangular shape where the number of pixels along the width dimension is not identical to the number of pixels along the height dimension of the respective blocks. Also, the number of blocks in the result is not restricted according to the invention, but it can be preferred that the blocks have a size of 4×4 pixels.

The biometric feature can, for example, be minutiae of a fingerprint of a user. The kind of the biometric feature can, in this case, for example indicate qualities or kinds of the minutiae, like whether they are ridges, bifurcations, deltas, islands or the like. The present disclosure is, however, not restricted to a particular biometric feature and/or particular kinds of that biometric feature of a fingerprint.

By providing the result, identifying each block and the respective information characteristic for the identified biometric feature, if present, reliable biometric information is provided. By processing the image in the manner as provided above, the requirement of previously trained orientation maps or segmentation masks is significantly reduced as the decision of whether or not biometric features are present in respective blocks is usually reduced to a binary decision, meaning that either there is a biometric feature present or not.

It can be provided that the information is further indicative of at least one of a quality of the biometric feature, a relative position of the biometric feature within the block, and/or an orientation of the biometric feature.

By providing this additional information through the processing, more sophisticated information on the biometric features is available, which can later on allow for reliably identifying a user using the information obtained throughout the processing.

In one embodiment, the presence of a biometric feature is indicated with a binary value or a value between 0 and 1, and/or wherein the kind of the biometric feature is labeled with a binary value or a value between 0 and 1. By providing binary values for both the presence of the biometric feature or a particular kind of the biometric feature, the further processing of the biometric features obtained as part of the result can be reduced as no regard is to be given to questions of probability of presence or kinds of biometric features. By using normalized values for indicating the presence or kind of biometric feature in a particular block, the output information can be used as part of a heuristic or probabilistic identification process for, for example, identifying a user using the biometric features.

In a further embodiment, the result is representable as a tensor having a rank of 3 (the rank essentially indicating the number of independent indices of the tensor). Two of the ranks can indicate, for example, the position of the particular blocks along the width and height dimension of the image, whereas the third rank indicates the information associated with the respective block.

It can be provided that the processing is performed by a neural network and the neural network provides, as output, the result. The neural network can be a neural network comprising one or more convolutional layers as well as one or more pooling layers and, as a last layer, an output layer that provides for an output having the dimension as required for the result. Particularly, the output can be a tensor having a rank of 3 or the output (result) is such that it can be represented as a tensor having a rank of 3.

Neural networks can be particularly trained for identifying the presence of biometric features in the respective blocks into which the image is separated throughout their processing. As already previously mentioned, the neural network can be designed so that the separation of the image into blocks is part of the processing itself.

The neural network can comprise, as a last layer, a dense layer that reduces the dimension and/or size of input received so that the result is representable as a tensor T having rank 3 and entries $T_{ijk}$, where indices i and j identify a block and the index k denotes the information associated with each block. With this tensor as output of the dense layer, a computationally efficient output is provided that can be used further, for example, in identifying a user.

It can be provided that the result is the tensor T or a matrix $X_{lk}$, where l identifies a block and k denotes the information associated with the block. Outputting the result in the form of a matrix having only two indices can be computationally more efficient, but this will require additional information indicating the arrangement of blocks according to their indices l.

In one embodiment, the dense layer receives an input that can be represented in the form of a tensor $Y_{ijc}$, where indices i and j identify a block and c identifies information associated with the block and wherein the index range of c is larger than the index range of k, and wherein the dense layer processes the input so that the tensor $T_{ijk}$ is obtained. For example, the input can have an index range for c that is 16 or more (c denoting the channels of the input received at the dense layer). This can then be reduced by the dense layer to an index k having a range of 6, where the range indicates the number of channels. By providing an input having a larger amount of channels, the information provided to the dense layer for providing the tensor T can be more sophisticated, resulting in the information associated with each block that is obtained by the dense layer being potentially more accurate.

The neural network can be a pre-trained neural network that was trained before transferring the neural network to a computing device executing the computer-implemented method. The neural network can be particularly trained to identify the intended biometric features. For example, a neural network employed for identifying minutiae as biometric features of an image of a user, like for example a fingerprint, can be particularly trained on training data that mostly or exclusively consists of images exhibiting fingerprints or parts of fingerprints. With this, the reliability of the identification of biometric features is improved.

In one embodiment, the blocks have an identical size of S×T pixels, S<N, T<M, wherein optionally, S=T.

The method can further comprise, after obtaining and before processing, determining whether N is an integer multiple of S and M is an integer multiple of T and, if at least one non-integer multiple is determined, resizing the image to a size N'×M' where N' is an integer multiple of S and M' is an integer multiple of T. The resizing can comprise rescaling the image to a larger or smaller size so that the requirement that N'is an integer multiple of S and M' is an integer multiple of T is fulfilled and/or the resizing can comprise padding the image along the width and/or height direction so as to achieve the multiplicity requirement mentioned above. With this embodiment, it is ensured that an original image, after resizing, can be processed correctly.

In one embodiment, S=T=4 and the resizing comprises resizing the image so that a width of the image is an integer multiple of 256. Using a block size of 4×4 pixels may be most preferred because in a block having a size of 4×4 pixels, usually only one biometric feature like a minutia or a particular pigment of an eye will be present. Thereby, the processing of the image or a block is reduced to the question of whether or not a single biometric feature is present. Thereby, the computational requirements in identifying biometric features are reduced.

The biometric features can be minutiae of a fingerprint. Minutiae are used by mobile devices and particularly contact scanners for identifying users in commonly used devices like smartphones. With this, the computer-implemented method according to embodiments of the invention can be employed by, for example, installing a corresponding application on commonly available mobile devices so that the advantages provided by the method can also be employed on already used systems.

In one embodiment, the obtained image is a black and white image or the obtained image is a colored image and the computer-implemented method further comprises, before the separating, transforming the image to a black and white image. Black-and-white images have the advantage that biometric features like minutiae can be identified through a more or less sharp contrast between different regions. Thereby, the reliability of biometric feature identification is further improved. Furthermore, this reduces the size of the input in terms of the number of channels. This can further reduce the required amount of computational resources.

According to aspects of the present disclosure, a computing system comprising a processor and memory is provided, wherein the memory comprises computer-executable instructions that, when executed by the processor, cause the computing system to perform a computer-implemented method according to any of the above embodiments. With this computing device, a reliable and computationally efficient obtaining of information on biometric features of a user is ensured.

Any of the above referred to embodiments can be combined with each other.

FIG. 1 shows a flowchart of a computer-implemented method (in the following also briefly referred to as "method") for obtaining information on biometric features of a fingerprint of a user, like for example information on minutiae of a fingerprint of a user, according to at least one embodiment of the present disclosure.

The method can be implemented on a single computing device or single computing system like, for example, a smartphone, tablet, or other mobile device that can execute the method as a standalone device, not requiring remote connection to another server or other computing device that would execute one or more of the steps described below. Alternatively, it can also be provided that the computer-implemented method is executed on several computing devices, where one computing device executes one or more steps of the method and another computing device executes other steps of the respective method. The present disclosure is not limited in this respect. However, embodiments where the methods discussed in the following are executed on a single computing device not requiring remote connection to other computing devices (except for potentially receiving or obtaining an image as discussed below) are preferred.

The method 100 begins with step 101 where an image is obtained. The image will be an image of a fingerprint of a user that carries a biometric feature. While, of course, other images could be obtained in step 101, the method is intended to facilitate the obtaining of biometric features from an image. Therefore, without loss of generality, it will be assumed that the image obtained in step 101 comprises such information, i.e. at least one biometric feature, like at least one minutia. It can be provided that a preliminary identification step is carried out on an obtained image where it is determined that it is at least highly likely that the image comprises at least one biometric feature. This can be done using commonly known object identification algorithms that identify the kind of object exhibited in the image. Should no object exhibiting a biometric feature be present in the image, the method 100 can end. This case will, however, not be discussed further in the following.

It can be provided that the image obtained in step 101 is a colored image. While it is also possible to process colored images with the method according to the invention and its embodiments, it can be preferred that the image finally processed is a black and white image as this can result in improved identification accuracy of biometric features shown in the image. Therefore, an optional step 102 can be provided where it is first checked whether the image is a black and white image and, if it is determined that the image is not a black and white image, the image is transformed using commonly known techniques to render the colored image a black and white image. This also results in the dimensionality of the image being reduced because the array of pixels making up the image only have three values, namely their position along the width and height dimension of the image and a binary value 0 or 1 indicating whether the respective pixel is a black or white pixel. This reduces the computational complexity of the processing of the image discussed further below.

The step 102 can be optional in any case.

The obtained image will be comprised of an array of pixels of size N×M. For example, the image size could be 256×512 pixels or any other image size.

As the further steps of the method require that the image size along the width and the height has a particular size, namely an integer multiple of the size of the blocks further used in processing the image, a preliminary check can be made in step 103 whether the width and height dimension of the obtained image represents multiple integers of the block width S and height T further used in the method.

For example, a check can be made whether the number of pixels N along the width of the image represents an integer multiple of the block's width S and/or whether the number of pixels M along the height dimension of the image represents an integer multiple M of the number of pixels T along the height dimension of the blocks.

If it is determined in step 103 that at least one of these conditions is not fulfilled, then the image can be resized in step 104. The resizing can comprise increasing or decreasing the number of pixels along the width and height dimension, keeping the aspect ratio of the image identical so as to fulfill at least one of the conditions of step 103.

For example, if, without loss of generality, the block size used further is 4×4, then the image size N×M must be an integer multiple for both N and M of 4. If the original image size is, for example, 213×477, then a resizing is required to either reduce the number of pixels along the width and height dimension to an integer multiple of 4 or increase it to an integer multiple of 4. Without loss of generality, for example, it can be assumed that the image is scaled so that the number N' of pixels along the width dimension is 256 (corresponding to a scaling factor of 256/213). This can be done by, for example, adding pixels using commonly known interpolation techniques. If the number of pixels were to be reduced, then the reduced pixels could be obtained from the original pixels by determining mean values of adjacent pixels and accumulating them in single pixels. Such methods are known to the skilled person in general.

The scaling factor is applied to both, the width and the height of the image, irrespective of whether applying this factor results in both the width and the height corresponding to an integer multiple of the width and height of the block. In any case, after applying the scaling factor, the image size is N'×M'.

Depending on the original number of pixels N×M, it may be the case that a resizing is applied so that the width dimension corresponds to an integer multiple of the block width S. However, it does not necessarily result in the number of pixels M' along the height corresponding to an integer multiple of the height T of the blocks.

If this is the case, then the scaled image can be padded by applying pixels having a default value along the dimension that does not already correspond to the intended integer multiple of the block size along this dimension (in the case above, the height dimension).

In some embodiments, it can be preferred that the resizing is done so that a scaling factor is chosen that results in the least amount of pixels being added or removed by means of interpolation or determining mean values, thereby less information is lost or diffused due to the resizing. It can also be provided that the resizing is performed so that either the height or the width dimension of the resized image has a particular number of pixels, for example 256 for the width dimension or 512 along the height dimension. The corresponding other dimension is then either padded or pixels have to be removed in order to reduce or increase the number of pixels along this dimension so as to achieve the same aspect ratio as obtained in the original image while at the same time realizing an intended size along this dimension and particularly ensuring that along this dimension the requirement according to step 103 is fulfilled.

Finally, depending on whether the steps 102 to 104 have been carried out, either a modified or the originally obtained image 101 (named image in the following in any case) is further processed in step 105.

Step 105 comprises processing the image to obtain a result where the result can be represented in the form of a number n×m of blocks of a particular size. These blocks are the blocks mentioned already above, in regards to steps 103 and 104 and the blocks have a size of S×T pixels. S and T are consequently integer numbers and can generally be of any value. However, S and T will be smaller than N, M respectively. S and T can either be equal, meaning that the result can be represented as blocks having a square shape, or S and T can not be equal, so that the image is separated into blocks having a rectangular shape. While not necessary, it is preferred that blocks have a size S×T where S=T so that the blocks have a square shape. Essentially, the blocks can be mapped to or correspond to a number of S×T pixels in the original image. The result associates, with each block, information obtained from the image regarding the biometric feature. This is done on block basis and not on pixel basis so that the result essentially associates the information on the biometric feature with the respective block where the biometric feature is found during processing in step 105 where the block represents a group of pixels.

Assuming that N and M are already properly sized (otherwise, a resizing step as discussed can be used to properly resize the original input image), n, m, S, T, N and M will fulfill the following relation: nS=N, mT=M.

The height and width of the blocks are not particularly restricted and can be anything from, for example, 2 pixels to 20 pixels. However, in view of the intention to identify biometric features in an image, it can be preferred that the height T and width S of the blocks is 3 or 4 or 5 or 6 pixels respectively, where 4 pixels are preferred. This is because using blocks having a size around 4×4 pixels ensures with substantial likelihood that only a single biometric feature like, for example, a minutia is depicted in a particular block. Thereby, further checks of, for example, whether or not there is a multiplicity of biometric features in a single block can be omitted, rendering the method 100 less computationally expensive, while still resulting in accurate identification accuracy of biometric features.

During the processing in step 105, it is identified whether or not a biometric feature is present and the kind or type the biometric feature has. In the result, the respective information is associated with the block in which the biometric feature is present. As mentioned above, the biometric features may be minutiae and there exist different kinds of minutiae. The computer-implemented method can be realized so that different kinds of minutiae can be identified like, for example, ridges, bifurcations, islands, ridge endings, ridge stops, deltas or ridge bifurcations. The present disclosure is not limited in this respect and also the present disclosure is not limited with respect to how many different kinds of biometric features can be identified. It can, for example, be provided that the method determines, for each block, whether the biometric feature corresponds to a first or a second type even though potentially other types may exist.

In addition to the information indicating whether a biometric feature exists and the identification of the kind of biometric feature for each block, it can also be provided that further information is included. For example, the information can further be indicative of at least one of a quality of the biometric feature. This can be represented by a normalized value ranging from 0 to 1. Furthermore, a relative position of the biometric feature within the block can be provided where this relative position can indicate a particular location of a particular pixel belonging to the biometric feature within the block.

If the block, for example, has a size of 4×4 pixels, then, in the result, a first pixel being identified to belong to the biometric feature can be indicated with its height and width coordinates within the block relative to the center of the block, for example to denote the position of the biometric feature within the block. Also, other embodiments can be envisaged where, for example, the relative position is indicated by denoting all pixels belonging to the biometric feature within this particular block.

The orientation of the biometric feature can either be represented by a numerical value between 0 and 2π so as to give the exact orientation or the orientation can also be normalized to a value between 0 and 1 where 0 can indicate a vertical arrangement from top to bottom and 0.5 can indicate a counter-vertical arrangement from bottom to top and so forth.

The information obtained on a particular biometric feature can then be provided as an output or result in step 106. The output can, for example, be in the form of a tensor T of rank 3(the rank indicating the number of independent indices). The entries $T_{ijk}$ of the tensor T can denote the position of a block along the width (first index i), the position of the block along the height (second index j), thereby defining the position of the groups of pixels for which each block is indicative, and the information associated with the block (third index k). The index range is defined for the first two indices by the number of blocks along the width and the height dimension of the image, whereas the index range of the third index k is defined by the different types of information associated with a biometric feature in the respective block.

For example, if the information contains only information on whether or not a biometric feature is present and which type of biometric feature it is, the index range can be 1+(number of types−1), where for each type a normalized value between 0 and 1 can be provided, indicating a likelihood of the respective biometric feature being of a particular type. It is noted that in such a case it is only necessary to give the likelihood for all types of biometric feature except for one type, because the likelihood must sum up to 1 in total, so that for n different types of biometric features, outputting the likelihood of n−1 biometric features is sufficient, as the n-th type of biometric feature will have a likelihood of $$1-\sum_{i=1}^{n-1} p_i,$$

where $p_i$ denotes the likelihood of the other types being present in a respective block.

If, additionally, the position of the biometric feature relative to, for example, the center of the block is to be included, the index range of k is increased by 2. Further, if the orientation is indicated as part of the information, the index range is increased by 1 and the same holds for the case where the quality of the biometric feature is to be indicated as a single number. This makes a total of 1+(number of types−1)+4 for the index range of k. In the example where there are only two types of biometric features that are to be distinguished from another, this makes a total index size of the third index k being 6.

Alternatively, it can also be provided that the result is represented in the form of a matrix X or can be represented in the form of a matrix having entries $X_{lk}$. This can comprise that the blocks of the image are consecutively enumerated from 1 to l, where l equals the total number of blocks. The second index k corresponds in its meaning and index range to the index k discussed above. If the result is provided in the shape of a matrix X, then additional information may be provided with respect to how the numbering of blocks is started or how many blocks there are along the width and/or the height dimension, so that the obtained information can be processed further.

The output result of step 106 (which can for example be the tensor T or matrix X mentioned above or any other output derived therefrom as long as the result is indicative of the blocks and the information associated with the blocks) can then be stored and/or can be further used to, for example, identify a user based on the blocks and potentially identified biometric features within the blocks. This can be done by, for example, comparing the result to a pre-stored profile of a respective user to determine whether the information associated with each block matches the pre-stored profile. This can be done on a block-per-block basis if this pre-stored profile is stored having the same shape as the result and/or it can comprise further image matching steps that are generally known to the skilled person.

The method described in relation to FIG. 1 can be executed or performed by an algorithmic program that uses, for example, a number of classifiers to process the image and generate an output in the shape as required. However, it can be preferred that the step 105 is executed by a neural network that processes the image and, through the processing, obtains the information and a result with the shape as required, i.e. a result that can be represented as a number of n×m blocks and information on the biometric feature associated therewith. In a preferred embodiment where the method according to FIG. 1 is executed on a mobile device only, the neural network can be a pre-trained neural network that has been trained to perform the step 105 before it has been transferred to the mobile device so that no further computationally expensive training has to be performed on the mobile device.

Figure 2:
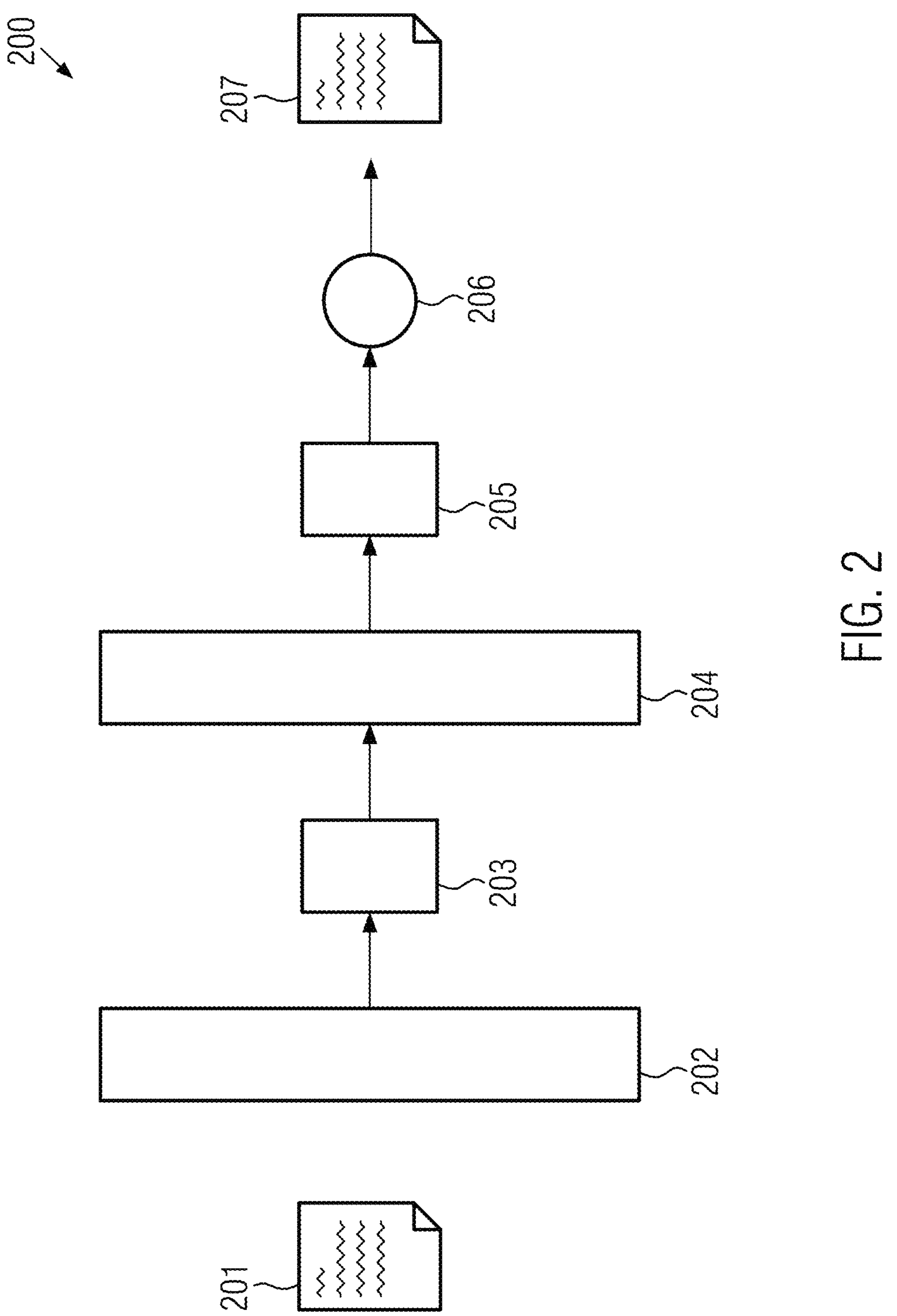
FIG. 2 shows a schematic depiction of a neural network used according to at least one embodiment of the present disclosure.

FIG. 2 depicts an exemplary architecture of the neural network, according to at least one embodiment of the present disclosure. In a preferred embodiment, the architecture generally comprises a plurality of layers that process the input 201, which is either the original obtained image or the further modified image using, for example, the steps 102 to 104 explained in relation to FIG. 1. The general architecture of the layer structure 202 to 206 of the neural network can employ the Inception V3 architecture, where a plurality of convolutional layers of potentially different kernel sizes are used and, after each processing step, the respective information is concatenated together. After at least one or several such blocks of convolutional layers 202, a pooling layer 203 can be provided that reduces an original input having the size A×B×C to (A/2)×(B/2)×D, where D can either be equal to C or larger than C, like D=2C. In this case, A and B denote the pixel size of the original image along the width and height dimension. The number of channels D depends on the internal architecture but is not intended to limit the invention.

After a further number of convolutional layers 204, a further pooling layer 205 can be provided that further reduces the size of the input received to (A/4)×(B/4)×L, where L can either equal k or can be larger or smaller than k (discussed below).

In the processing order after the second pooling layer, preferably immediately after the pooling layer, a dense layer is provided that provides, as an output, for example, the tensor $T_{ijk}$. The index range of i=A/4 (number of blocks along the width dimension), j=B/4 (number of blocks along the height dimension) and the index range k denotes the number of output channels, where k may for example be of the index range as mentioned above in relation to FIG. 1 already. In the case of, for example, two types of biometric features having to be identified and additionally their quality, their relative position within the block and their orientation are to be provided, this value k will have an index range of 6 as explained already above.

However, the architecture is not limited in this respect and also other architectures can be used. Nevertheless, the Inception V3 architecture commonly available and known to the skilled person has proven to yield results having a high quality.

It is noted that after the dense layer there can also be provided a sigmoid layer to achieve normalization of the original output of the dense layer should values that are, for example, provided in the entries denoted by k, not be normalized in the output of the dense layer, but normalization is required for the further processing.

One neural network that has been found to be particularly suitable to carry out methods according to the invention after having been trained in the manner as described further below will be explained in the following.

The neural network comprises a first input layer that provides the (optionally resized) input image. The output size of that layer may be 256×256×A. A denotes the number of channels. For a black and white image, this can be 1. For a colored image, this can be 3 (one channel per color value).

Subsequently, a 2D convolutional layer is provided that receives the input and provides, as output, a structure having the size 256×256×32. This layer thus increases the number of channels by processing the input image.

In processing order following the 2D convolutional layer, a max-pooling layer is provided that processes the input received from the convolutional layer and provides an output with size 128×128×32, whereby the channel number is maintained but the size is reduced in each other dimension to half.

Subsequent to this max-pooling layer, a second convolutional layer is provided that processes the input received from the max-pooling layer and provides an output having a size 128×128×64. This second convolutional layer is followed by a second max-pooling layer which processes the input received from the second convolutional layer and provides an output having a size 64×64×64, thereby further reducing the size in the other two dimensions but keeping the number of channels the same.

The second max-pooling layer is followed by two convolutional layers. The first of these two provides an output with size 64×64×128 and the subsequent convolutional layer provides an output with size 64×64×6. The subsequent convolutional layer can alternatively also be realized as a dense layer as discussed above.

It is noted that only the convolutional layers of this architecture comprise trainable parameters whereas the max-pooling layers and the mentioned dense layer are fixed structures not requiring training.

As far as this architecture is used for the neural network, the training described in the following in relation to FIG. 3 can be used to train the trainable parameters of the convolutional layers.

Figure 3:
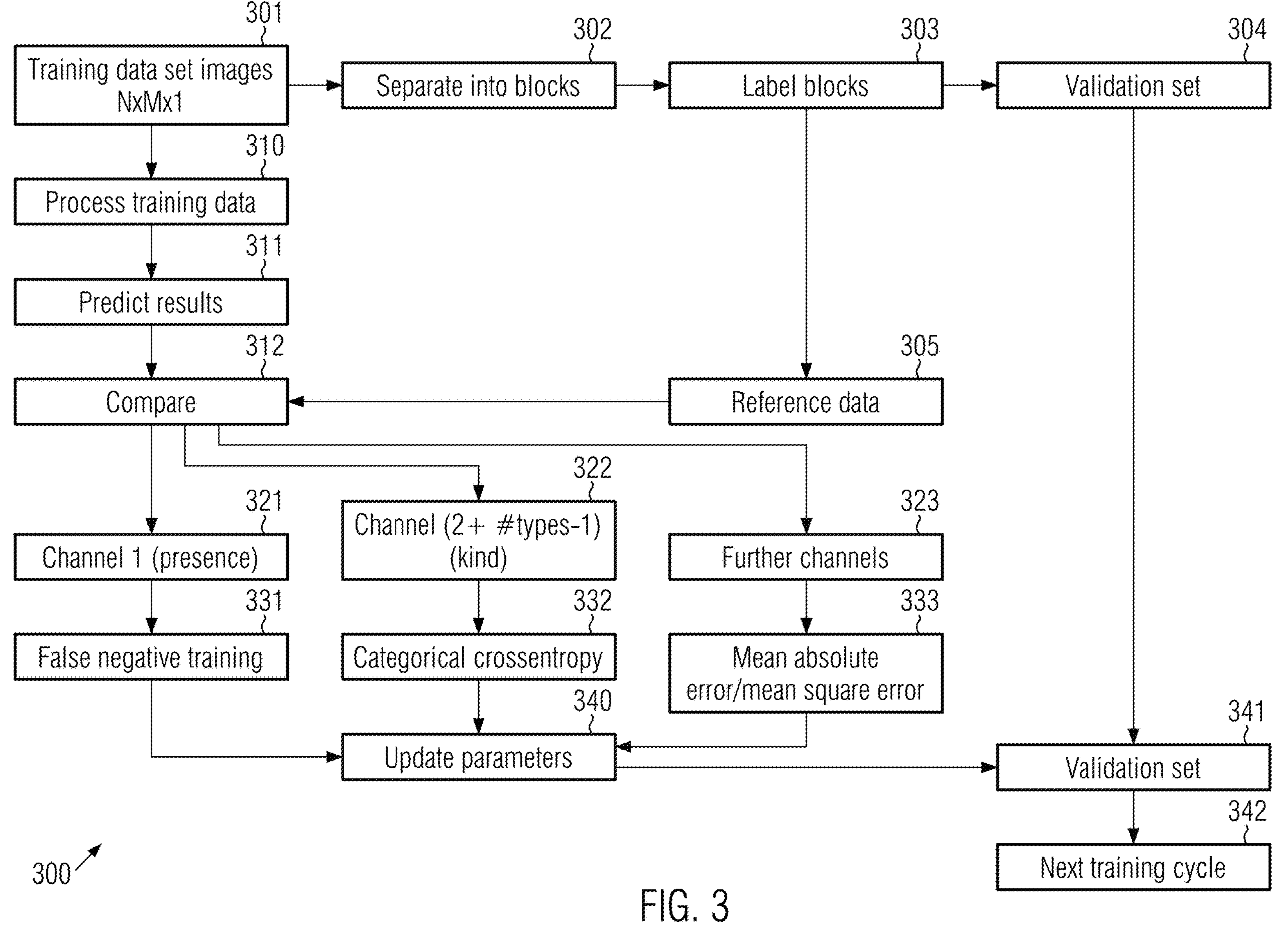
FIG. 3 shows a flowchart of a training process according to at least one embodiment of the present disclosure.

FIG. 3 shows one exemplary training algorithm for training the respective neural network discussed in relation to FIG. 2, according to at least one embodiment of the present disclosure.

The general approach taken for the training is identical to training approaches commonly employed for neural networks.

The method 300 begins with providing 301 a training dataset comprising images (several hundreds or thousands of images) that are preferably black and white images and have a size N×M×1 (one color channel). Without loss of generality, it will be assumed that N and M already correspond to integer multiples of the intended block size as discussed above. Otherwise, a resizing as already discussed in relation to FIG. 1 can be executed before the further steps described in the following are executed to obtain training data with the required size. Should the original images in the training data set be colored images, it can optionally be provided that they are transformed into black and white images. Otherwise, the training can also be carried out using either only colored images or using a mixture of colored and black and white images.

In a subsequent step 302, the images of the training dataset are separated into blocks of identical size (for example 4×4 pixels). In step 303, each of the blocks is labeled with the information that is to be identified. This can, for example, comprise associating a label to the respective block with a first value indicating whether or not a biometric feature is present (a binary value of 1—biometric feature is present—or 0—biometric feature is not present—, or a value between 0 and 1 indicating a likelihood of the feature being present), providing further labels denoting which type of biometric feature is present in the respective block (minutia, ridge, delta, bifurcation, etc.) and, if provided, providing additional information on the quality of the depicted biometric feature, the orientation of the biometric feature within the block, and the relative position of the biometric feature within the block as already discussed in relation to FIGS. 1 and 2 above with respect to the results to be output after processing the respective image.

Having labeled the respective blocks in the images, the training dataset can be separated into reference data 305 that is used in the training cycles and a validation set 304 that is used for validating the training progress.

The original training data (not separated into blocks, but the original images) can then be processed by the not trained neural network 310 after initialization of the parameters of the neural network. This can comprise processing the full dataset corresponding to the reference data 305 but not processing the images corresponding to the validation set. It can also be provided that not the whole data corresponding to the reference data is processed in step 310 but that the training data is further separated into batches that are either processed one after the other or that are processed only after the updating of parameters of the neural network in a next training cycle.

In any case, the neural network attempts to predict a result in step 311, i.e. providing a result that has (by default due to the architecture of the neural network) a shape that can be represented as a number of n×m blocks of size S×T where each block has with it associated information on the biometric feature, comprising an indication of the presence of a biometric feature, the type of the biometric feature, and potentially further information including the position of the biometric feature within the block, the quality of the biometric feature, and the orientation of the biometric feature.

The output will consequently be representable in the form of a tensor of size n×m×C. C in this case denotes the number of channels or different kinds of information associated with each block. As mentioned above, C may be any value but will generally be 1+(number of types−1)+d depending on what information is to be provided for biometric features. Here, d denotes the different kinds of additional information that can be provided (for example, position of the biometric feature in the block, orientation and quality).

In the next step 312, the predicted results are compared to the reference data 305 to determine, for each block of each image of the training data used, the accuracy with which the neural network has determined the respective label.

For the first channel of the indicative information, which denotes the presence of the biometric feature in each block, it can be provided that most weight is given to the accuracy of classification between the to-be-identified biometric feature, like a minutia, and the biometric feature not being present. This can employ binary cross-entropy, where firstly, a false negative identification rate r of the biometric features as determined by the neural network in step 310 is determined. This negative rate indicates how many of the blocks in the predicted data were predicted to not exhibit the biometric feature by, for example, having an output value smaller than 0.5 or being 0 in the case of only binary results, while the labeled reference data 305 indicates for the respective blocks that a biometric feature is present so that the value obtained by the neural network should have been either larger than 0.5 or equal to 1.

The number of false negative blocks is then divided by the total number of blocks that show a biometric feature. This total number of blocks includes both those blocks that were erroneously identified to not exhibit a biometric feature and the blocks that were correctly identified.

Then binary cross-entropy can be used where the loss of positive labels in the binary cross-entropy can be weighed by a factor of k(1+r). By selecting k not equal to 0, the training of the neural network and modifying of its parameters will make the model more biased towards reducing false negatives identifications (i.e. not identifying a biometric feature in a block where there actually is one).

This results in, after the training, preferably all biometric features present in an image being identified even though there may be additionally false positive identifications (biometric features are identified while there actually are none in a particular block). However, while false positive identifications can also have a negative impact on, for example, an identification accuracy with which the user can be identified by the obtained image, these are less relevant in user identification. This is because user identification can be assumed to be accurate if a minimum number of matches of biometric features is determined, like for example 10 minutiae at particular positions. By ensuring that the neural network is trained towards identifying as many biometric features as possible, the identification accuracy with which a user is identified or can be identified by the output of the neural network can be improved.

With respect to the channels denoting the types of biometric features like minutiae, it can be determined in steps 322 and 332 using categorical cross-entropy whether the neural network correctly identified the kind of the biometric feature in each block of the result. In a simplified case where the number of kinds of biometric features is 2, the categorical cross-entropy will be identical to the binary cross-entropy.

Throughout the training, if, for a particular block, the labelled reference data 305 indicates that there is no biometric feature present, the loss of these channels indicating the type of biometric feature will equally be set to 0 so as to avoid false training.

For the further information that can be associated with each block (like the position of the biometric feature within the block, the orientation of the biometric feature and the quality of the biometric feature) it can be provided that the comparison step 312 comprises step 323 and step 333 relating to these channels where mean absolute error or mean square error are determined for the predicted results compared to the reference data 305 to identify the training result.

In step 340 and based on the results of the comparison step 312, the parameters of the neural network can then be updated by, for example, using gradient descent techniques or the equally known technologies for modifying parameters of neural networks in a training cycle.

Optionally, the neural network, with its updated parameters, can then be provided with the validation set in step 341 for determining whether or not the training has already progressed enough to end the training and use the neural network with its most recent parameters.

If this is not the case (for example the accuracy with which the validation set is predicted is below a given threshold) or if a condition for processing the validation set 341 using the current training status of the neural network is not yet fulfilled, the next training cycle 342 can begin with the processing of the training data 310 as discussed above.

The condition for processing the validation set can, for example, be a number of training cycles that have already been executed or a behavior of the change of the parameters during the updating in step 340. For example, if it appears that the parameters of the neural network converge from one training cycle to the other, this can be used as an indication that training is almost completed and the validation set can be used to determine whether this indeed is the case or whether the neural network has erroneously been trained to only be optimized to identify the images within the training data.

As regards the training data in general, it is noted that the images in the training data set can be of different size to allow for training the neural network on different input image sizes as long as these are an integer multiple of the respective block size. This can not only be used to render the neural network more flexible as regards the input size of the images, but it can also be used to determine whether the neural network used is particularly suitable to process images of a particular size. If the latter is determined, it can be provided that a resizing step (like steps 103 and 104 discussed in relation to FIG. 1) is designed so that input images are always resized to this particular optimized image size for processing in the neural network.

The training data preferably further comprises several, preferably thousands of different images exhibiting the biometric features in different positions and qualities. For example, if the biometric features are minutiae, the training data can comprise images showing minutiae at different positions and in different orientations and qualities. This can be realized by using a limited number of images like, for example, 50 or 100 fingerprints that are further processed before they are used as training data. Thereby, the number of images forming the training data can be increased by, for example, rotating the images so that the biometric features are at different positions and/or changing the contrast or introducing other image quality modifying transformations like blurring so that also the quality is changed. Furthermore, it is preferred that there are equally many images or blocks in the training data that show different kinds of biometric features so that the training of the neural network is not biased towards identifying one particular kind of biometric feature, whereas there are several kinds of biometric features that have to be identified and distinguished.

Once training is completed, the neural network can be transferred to a device for executing the method as discussed with respect to FIG. 1. The neural network will process the received input images. The output will always be representable in the form of n×m blocks (due to the structure of the neural network), where each of these blocks is associated with information on a biometric feature that may be present in the block.

It is noted that due to the fact that the blocks in the result correspond to particular pixels in the original image, it is immediately possible to identify, from the result, the position of the biometric feature(s) in the actual input image.

Figure 4:
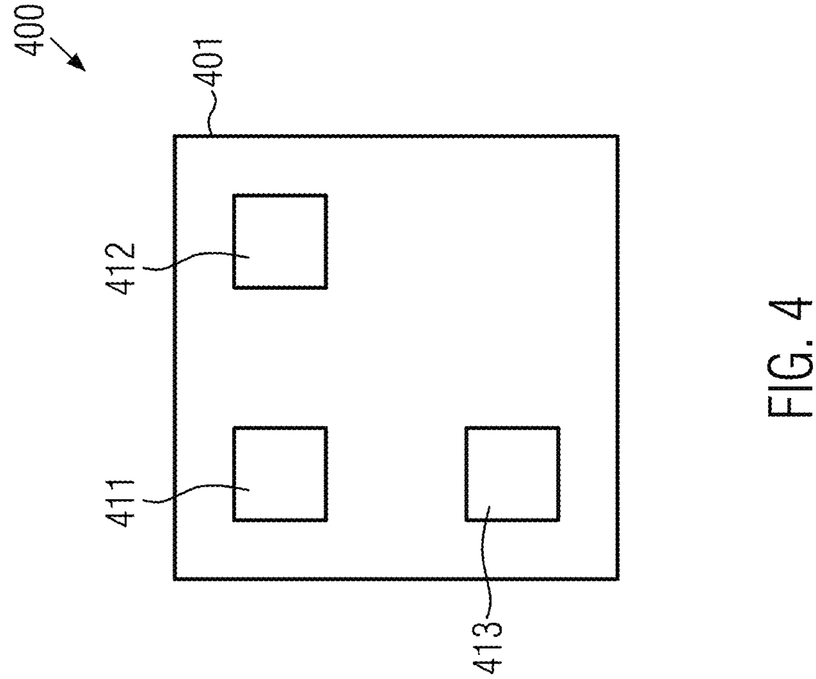
FIG. 4 shows a schematic depiction of a computing system according to at least one embodiment of the present disclosure.

FIG. 4 shows a mobile device 400 as an exemplary embodiment of a computing system for executing the method according to FIG. 1.

The mobile device can, for example, be a smartphone or a tablet having a casing 401 in which further components are included. The mobile device comprises a processor 412 and associated memory 413 where the memory 413 can comprise an application or program code that, when executed by the processor 412, allows the computing system to execute the method according to FIG. 1 or at least steps 102 to 106 or at least steps 105 and 106.

Furthermore, the mobile device 400 can comprise a sensor 411 for obtaining an image that comprises a biometric feature of a user. The sensor 411 can be a contact-less sensor like a camera or it can be a contact sensor like a touch sensor for obtaining an image of a finger, for example. The computing system is not limited in this respect.

It is to be understood that the above description is intended to be illustrative, and not restrictive. Other embodiments will be apparent upon reading and understanding the above description. Although embodiments of the present disclosure have been described with reference to specific example embodiments, it will be recognized that the present disclosure is not limited to the embodiments described, but can be practiced with modification and alteration within the spirit and scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A computer-implemented method for obtaining information on one or more biometric features of a fingerprint of a user, the method comprising:

obtaining an image comprising an object carrying the one or more biometric features of the user, the image having a size of N×M pixels;

processing the image and determining information indicative at least of a presence of a biometric feature of the one or more biometric features in a block of a plurality of blocks of the image and a kind of the biometric feature; and outputting a result of the processing, the result identifying the information, wherein the result has a form of n×m blocks of identical size, and wherein the result associates information indicative at least of the presence of the biometric feature and the kind of the biometric feature with each block of the plurality of blocks, wherein N is a first integer multiple of n and M is a second integer multiple of m;

wherein the presence of the biometric feature is indicated with a first binary value;

wherein the result is used to identify a user based on the blocks and identified biometric features within the blocks;

wherein the plurality of blocks have an identical size of S×T pixels, wherein $S<N$ and $T<M$, and wherein $S=T=4$; and wherein the computer-implemented method further comprises:

after obtaining the image and before processing the image, determining whether N is a third integer multiple of S and M is a fourth integer multiple of T; and responsive to determining that at least one non-integer multiple is determined, resizing the image to a size N'×M' where N' is a fifth integer multiple of S and M' is a sixth integer multiple of T.

2. The computer-implemented method according to claim 1, wherein the information is further indicative of at least one of a quality of the biometric feature, a relative position of the biometric feature within the block, or an orientation of the biometric feature.

3. The computer-implemented method according to claim 1, wherein the kind of the biometric feature is labeled with a second binary value or a second value between 0 and 1.

4. The computer-implemented method according to claim 1, wherein the result is representable as a tensor having a rank of 3.

5. The computer-implemented method according to claim 1, wherein the processing is performed by a neural network, and wherein the neural network provides, as output, the result.

6. The computer-implemented method according to claim 5, wherein the neural network comprises, as a last layer, a dense layer that reduces at least one of a first dimension or a first size of a first input received, so that the result is representable as to a tensor T having rank 3 and entries $T_{ijk}$, where indices i and j identify the block and index k denotes the information associated with each corresponding block.

7. The computer-implemented method according to claim 6, wherein the result comprises one of the tensor T or a matrix $X_{lk}$, where 1 identifies the block and k denotes the information associated with the block.

8. The computer-implemented method according to claim 6, wherein the dense layer receives an input that can be represented in the form of a first tensor $Y_{ijc}$, where indices i and j identify the block and c identifies information associated with the block, and wherein a first index range of c is larger than a second index range of k, and wherein the dense layer processes the input so that the tensor T with entries $T_{ijk}$ is obtained.

9. The computer-implemented method according to claim 5, wherein the neural network is a pre-trained neural network that was trained before transferring the neural network to a computing device executing the computer-implemented method.

10. The computer-implemented method according to claim 1, wherein resizing the image comprises resizing the image so that a width of the image is a seventh integer multiple of 256.

11. The computer-implemented method according to claim 1, wherein the one or more biometric features comprise minutiae of the fingerprint.

12. The computer-implemented method according to claim 1, further comprising:

responsive to determining that the obtained image is not a black-and-white image, transforming the image to a black and white image prior to processing the image.

13. A computing system comprising a processor and memory, wherein the memory comprises computer-executable instructions that, when executed by the processor, cause the computing system to perform a computer-implemented method comprising:

obtaining an image comprising an object carrying one or more biometric features of a user, the image having a size of N×M pixels;

processing the image and determining information indicative at least of a presence of a biometric feature of the one or more biometric features in a block of a plurality of blocks of the image and a kind of the biometric feature; and outputting a result of the processing, the result identifying the information, wherein the result has a form of n×m blocks of identical size, and wherein the result associates information indicative at least of the presence of the biometric feature and the kind of the biometric feature with each block of the plurality of blocks, wherein N is a first integer multiple of n and M is a second integer multiple of m;

wherein the presence of the biometric feature is indicated with a first binary value;

wherein the result is used to identify a user based on the blocks and identified biometric features within the blocks; and wherein the plurality of blocks have an identical size of S×T pixels, wherein S<N and T<M, and wherein S=T=4; and wherein the method further comprises:

responsive to obtaining the image and prior to processing the image, determining whether N is a third integer multiple of S and M is a fourth integer multiple of T; and responsive to determining that at least one non-integer multiple is determined, resizing the image to a size N'×M' where N' is a fifth integer multiple of S and M' is a sixth integer multiple of T.

14. The computing system according to claim 13, wherein the information is further indicative of at least one of a quality of the biometric feature, a relative position of the biometric feature within the block, or an orientation of the biometric feature.

15. The computing system according to claim 13, wherein the kind of the biometric feature is labeled with a second binary value or a second value between 0 and 1.

16. The computing system according to claim 13, wherein the processing is performed by a neural network comprising, as a last layer, a dense layer that reduces at least one of a first dimension or a first size of a first input received so that the result is representable as to a tensor T having rank 3 and entries $T_{ijk}$, where indices i and j identify the block and index k denotes the information associated with each corresponding block; wherein the dense layer receives an input that can be represented in the form of a first tensor $Y_{ijc}$, where indices i and j identify the block and c identifies information associated with the block, and wherein a first index range of c is larger than a second index range of k, and wherein the dense layer processes the input so that the entries $T_{ijk}$ are obtained; and wherein the neural network provides, as output, the result comprising one of the tensor T or a matrix $X_{lk}$, where I identifies the block and k denotes the information associated with the block.

17. The computing system according to claim 13, wherein the method further comprises:

responsive to determining that the obtained image is not a black-and-white image, transforming the image to a black and white image prior to processing the image.

* * * * *